(12) United States Patent
Bonang et al.

(10) Patent No.: US 11,249,175 B2
(45) Date of Patent: Feb. 15, 2022

(54) AEROSTAT DEPLOYABLE FROM SONOBUOY LAUNCH CONTAINER

(71) Applicant: The Boeing Company, Chicago, IL (US)

(72) Inventors: James Joseph Bonang, Garden Grove, CA (US); Steven Lee Gall, Ladera Ranch, CA (US); Michael Jeffrey Greenfield, Anaheim, CA (US); Randall L. Mosten, Irvine, CA (US); Matthew Joseph Ragozzino, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 363 days.

(21) Appl. No.: 16/444,963

(22) Filed: Jun. 18, 2019

(65) Prior Publication Data

US 2020/0400804 A1 Dec. 24, 2020

(51) Int. Cl.
*B63B 22/00* (2006.01)
*B63G 8/39* (2006.01)
*G01S 7/537* (2006.01)

(52) U.S. Cl.
CPC ............ *G01S 7/537* (2013.01); *B63B 22/003* (2013.01); *B63G 8/39* (2013.01)

(58) Field of Classification Search
CPC .......... G01S 7/003; G01S 7/537; G01S 15/66; B63G 8/39; B63B 22/003
USPC .......................................................... 367/3
See application file for complete search history.

(56) References Cited

U.S. PATENT DOCUMENTS

| | | | | |
|---|---|---|---|---|
| 3,543,228 A | * | 11/1970 | Farmer | B63B 22/003 367/4 |
| 3,691,573 A | | 9/1972 | Laudato, Jr. | |
| 4,123,987 A | * | 11/1978 | Singerle | B64B 1/50 116/277 |
| 4,185,582 A | * | 1/1980 | Bryant | G08B 5/002 116/210 |
| 4,962,488 A | * | 10/1990 | Dell-Imagine | H01Q 1/04 343/709 |

(Continued)

OTHER PUBLICATIONS

Lisa Zyga; Electricity from seawater: New method efficiently produces hydrogen peroxide for fuel cells; https://phys.org/news/2016-05-electricity-seawater-method-efficiently-hydrogen.

(Continued)

*Primary Examiner* — Daniel L Murphy
(74) *Attorney, Agent, or Firm* — Duft & Bornsen, PC

(57) ABSTRACT

Systems and methods are provided for aerostat deployable from sonobuoy launch container. One embodiment is an apparatus that includes a capsule configured to launch from an aircraft and float in seawater with one or more sonobuoys. The capsule includes a receiver configured to receive sonobuoy data from the one or more sonobuoys, a transmitter configured to transmit the sonobuoy data to the aircraft, a cable configured to power the transmitter via a battery, and a reaction chamber including a reactant and configured to generate a gas from the seawater mixing with the reactant. The capsule also includes an aerostat tethered to the capsule via the cable and configured to inflate with the gas produced by the reaction chamber, and to ascend above the capsule with the transmitter to increase a distance for transmitting the sonobuoy data to the aircraft.

20 Claims, 8 Drawing Sheets

(56) References Cited

U.S. PATENT DOCUMENTS

| | | | | |
|---|---|---|---|---|
| 6,056,237 | A * | 5/2000 | Woodland | F42B 15/22 |
| | | | | 244/3.15 |
| 7,184,363 | B2 * | 2/2007 | Szegedi | B63H 19/02 |
| | | | | 367/3 |
| 9,638,829 | B2 * | 5/2017 | Davoodi | G01V 11/002 |
| 2017/0057635 | A1 | 3/2017 | Strayer | |

OTHER PUBLICATIONS

Aerostat; https://en.wikipedia.org/wiki/Aerostat.
Air—Density, Specific Weight and Thermal Expansion Coefficient at Varying Temperature and Constant Pressures; https://www.engineeringtoolbox.com/air-density-specific-weight-d_600.html.
David Jones; Flying Heavier or Lighter Than Air; https://www.chemistryworld.com/opinion/flying-heavier-or-lighter-than-air/6195.article.
http://www.intpowertechcorp.com/H2_Seawater_1TOFCJ.pdf.
https://www.airbornesystems.co.uk/airborne-systems-products-services/aerial-delivery-search-and-rescue-products/aerial-delivery-equipment-sar-copy-2/skad-survival-kit-air-droppable/.
Kevin Bullis; Harvesting Power From the Ocean; https://www.technologyreview.com/s/408557/harvesting-power-from-the-ocean/ Aug. 23, 2007.
Melissa Mahony; Generating hydrogen from seawater to power boats; http://www.zdnet.com/article/generating-hydrogen-from-seawater-to-power-boats/; Oct. 26, 2010.
Nidhi Subbaraman; Making Unlimited Hydrogen From Salt Water and Wastewater; https://www.fastcompany.com/1781495/making-unlimited-hydrogen-salt-water-and-wastewater; Sep. 20, 2011.
Ocean Energy Light Buoy; Dept of Energy Technology Aalborg University.
Power Buoy: Energy of Waves to Charge Underwater Robots; Futurist News; http://futuristicnews.com/power-buoy-anergy-of-waves-to-charge-underwater-robots/.
Tina Casey; With This Modest Little Machine, US Navy Could Rule the Seas; https://cleantechnica.com/2015/01/02/new-machine-makes-sustainable-hydrogen-from-seawater/.
University of Wollongong; Splitting the sea: Turning ocean water into hydrogen fuel; https://phys.org/news/2013-06-sea-ocean-hydrogen-fuel.html.

* cited by examiner

AEROSTAT DEPLOYABLE FROM SONOBUOY LAUNCH CONTAINER

FIELD

The disclosure relates to the field of Anti-Submarine Warfare (ASW) communication devices, and in particular, to communication devices that interface with sonobuoys.

BACKGROUND

A sonobuoy is a sensor that is dropped from an aircraft into the ocean to detect potential hostile submarines. Anti-Submarine Warfare (ASW) aircraft, such as the P-8A Poseidon aircraft or the MH-60 Seahawk helicopter, may be equipped with a pneumatic launcher or a free-fall launch chute that ejects multiple sonobuoys in a field or tactical pattern in the ocean. However, the sonobuoys have limited communication range and power for transmitting data to the ASW aircraft.

SUMMARY

Embodiments described herein provide an aerostat that is deployable from a sonobuoy launch container. The aerostat is a balloon-type aircraft that floats in the air when inflated with a buoyant gas. The aerostat is initially uninflated and folded into a sonobuoy launch container which is dropped from an Anti-Submarine Warfare (ASW) aircraft into the ocean with a field of sonobuoys. After landing in the ocean, seawater enters the sonobuoy launch container and produces a gas that inflates the aerostat and launches it from the sonobuoy launch container and into the air. The aerostat is tethered to the sonobuoy launch container by a cable that transmits power/data to communication device(s) on the aerostat. Individual sonobuoys in the field are able to send their data to the relatively nearby sonobuoy launch container and/or aerostat, rather than directly to an ASW aircraft, thereby reducing power consumption and increasing operating lifespan of sonobuoys in the field. The aerostat transmits the sonobuoy data at a height above the ocean surface for increased communication range with the ASW aircraft.

One embodiment is an apparatus that includes a capsule configured to launch from an aircraft and float in seawater with one or more sonobuoys. The capsule includes a receiver configured to receive sonobuoy data from the one or more sonobuoys, a transmitter configured to transmit the sonobuoy data to the aircraft, a cable configured to power the transmitter via a battery, and a reaction chamber including a reactant and configured to generate a gas from the seawater mixing with the reactant. The capsule also includes an aerostat tethered to the capsule via the cable and configured to inflate with the gas produced by the reaction chamber, and to ascend above the capsule with the transmitter to increase a distance for transmitting the sonobuoy data to the aircraft.

Another embodiment is a method that includes launching a capsule from an aircraft to float in seawater with one or more sonobuoys, and admitting the seawater into the capsule to mix with a reactant to generate a gas. The method also includes inflating an aerostat with the gas to deploy the aerostat from the capsule and to lift a transmitter to a height above the capsule via a cable that tethers the aerostat with the capsule, and transmitting sonobuoy data from the one or more sonobuoys at the height above the capsule to the aircraft.

In a further embodiment, the method includes deploying a sea anchor beneath the capsule to drag in the seawater and maintain a position of the capsule with respect to the one or more sonobuoys. In yet a further embodiment the method includes capturing wave motion energy from relative motion of the capsule with respect to a sea anchor, charging a battery in the capsule with the wave motion energy, and powering the transmitter with the battery via the cable that tethers the aerostat with the capsule.

Yet another embodiment is a system that includes an aircraft and a capsule configured to drop from the aircraft with one or more sonobuoys to float in seawater. The capsule is configured to admit the seawater to mix with a reactant to generate a gas, to inflate an aerostat with the gas to deploy the aerostat from the capsule and to lift a transmitter to a height above the capsule via a cable that tethers the aerostat with the capsule, and to receive sonobuoy data from the one or more sonobuoys. The transmitter on the aerostat is configured to transmit the sonobuoy data at the height above the capsule to the aircraft.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
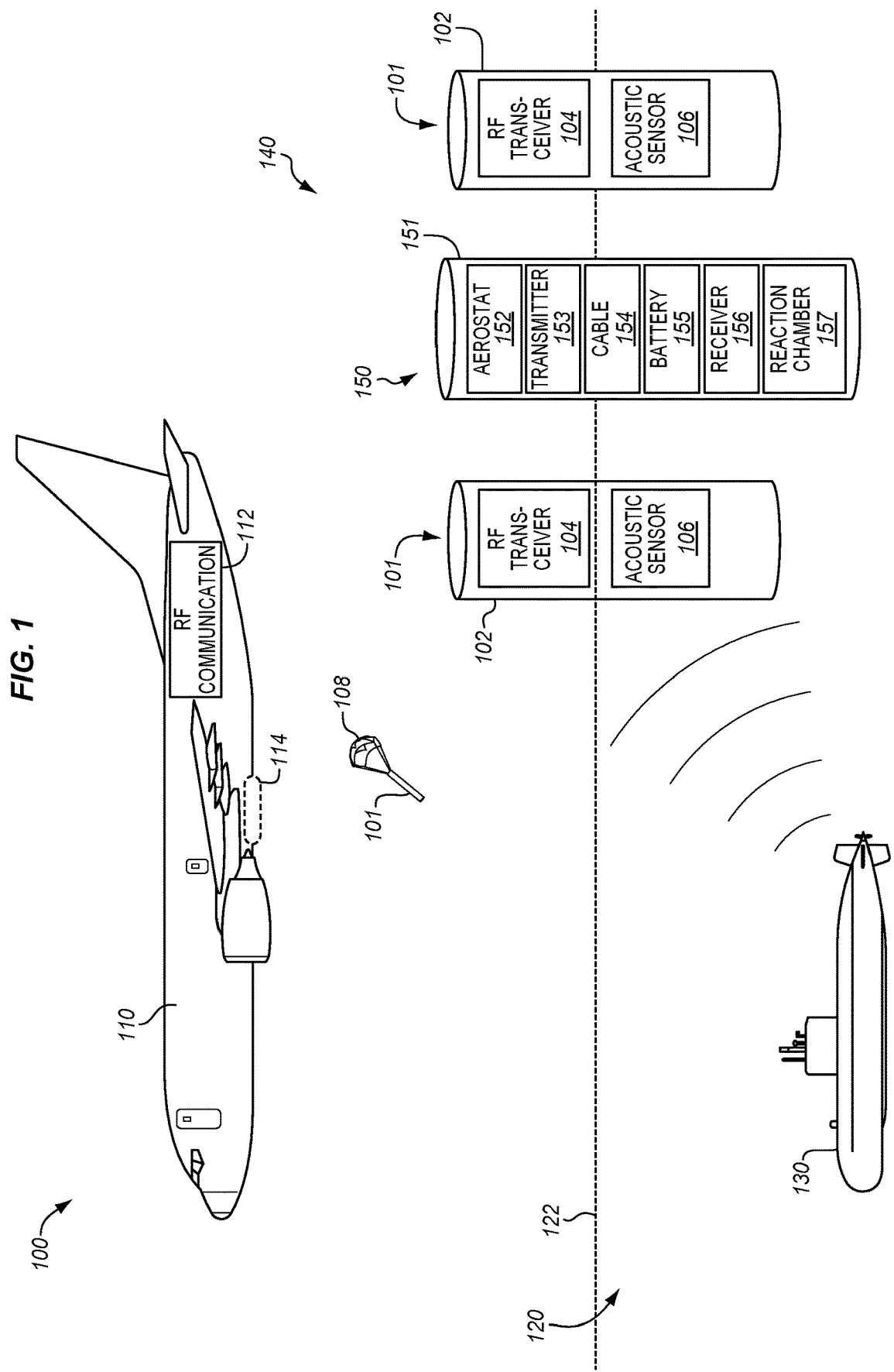
FIG. 1 illustrates an environment for deploying sonobuoys in an illustrative embodiment.

FIG. 1 illustrates an environment 100 for deploying sonobuoys 101 in an illustrative embodiment. The sonobuoys 101 are dropped from an aircraft 110 into seawater 120 to perform Anti-Submarine Warfare (ASW) functions. Each sonobuoy 101 may comprise a container 102 to house a Radio Frequency (RF) transceiver 104 and an acoustic sensor 106. To identify and track underwater targets, including potentially hostile underwater vehicles such as a submarine 130, the acoustic sensors 106 detect acoustic signals in the seawater 120. For example, the acoustic sensors 106 may include a hydrophone to passively listen for sound energy or a transducer and transmitter to actively listen for return echo off an object.

The aircraft 110 may include on-board RF communication 112 to receive the sensor data obtained by the acoustic sensors 106 and transmitted by the RF transceivers 104 of the sonobuoys 101. The sensor data may be used by the aircraft 110 to determine an exact location of the submarine 130 and/or inform tactical decisions. The aircraft 110 may include a fixed-wing aircraft, rotorcraft, blimp, unmanned aerial vehicle, etc. In some embodiments, the aircraft 110 comprises Anti-Submarine Warfare (ASW) aircraft such as the P-8A Poseidon aircraft or the MH-60 Seahawk helicopter. Accordingly, the aircraft 110 may be equipped with a sonobuoy launcher 114 that ejects the sonobuoys 101 in a sonobuoy field 140 or tactical pattern in the seawater 120. The sonobuoy launcher 114 may include a pneumatic launcher, sonobuoy ejector tubes, or a gravity fall chute. To fit with and properly eject from the sonobuoy launcher 114, the containers 102 of the sonobuoys 101 may have standardized dimensions. For example, the containers 102 may comprise the type A sonobuoy launch container including a cylindrical body with a length of 36 inches and a diameter of 4 and ⅞ inches.

The sonobuoys 101 may deploy from the aircraft 110 with a drogue chute 108 to control descent. Typically, the sonobuoys 101 descend below a surface 122 of the seawater 120 upon splashdown and then float back to the surface 122 where they perform ASW functions including collecting and reporting sonobuoy data to the aircraft 110. However, because the sonobuoys 101 transmit data from the surface 122 of the seawater 120, the aircraft 110 is forced to stay relatively close to the sonobuoys 101 to receive sonobuoy data. That is, RF signals sent at a low height have a limited horizon to reach the aircraft 110. Additionally, the sonobuoys 101 have limited mission endurance due to the amount of battery energy that is expended on transmitting data to the aircraft 110.

To remedy these issues, an aerostat buoy 150 is deployed with the sonobuoys 101. The aerostat buoy 150 may be ejected from the sonobuoys launcher 114 of the aircraft 110 into the sonobuoy field 140 in the seawater 120. The aerostat buoy 150 includes a capsule 151 that houses an aerostat 152, transmitter 153, cable 154, battery 155, receiver 156, and reaction chamber 157. As described in greater detail below, the aerostat buoy 150 serves as an immediately deployable communication tower for the sonobuoy field 140 that relays sensor data of the sonobuoys 101 to increase communication range with the aircraft 110 and extend the operating lifespan of the sonobuoys 101.

Figure 2:
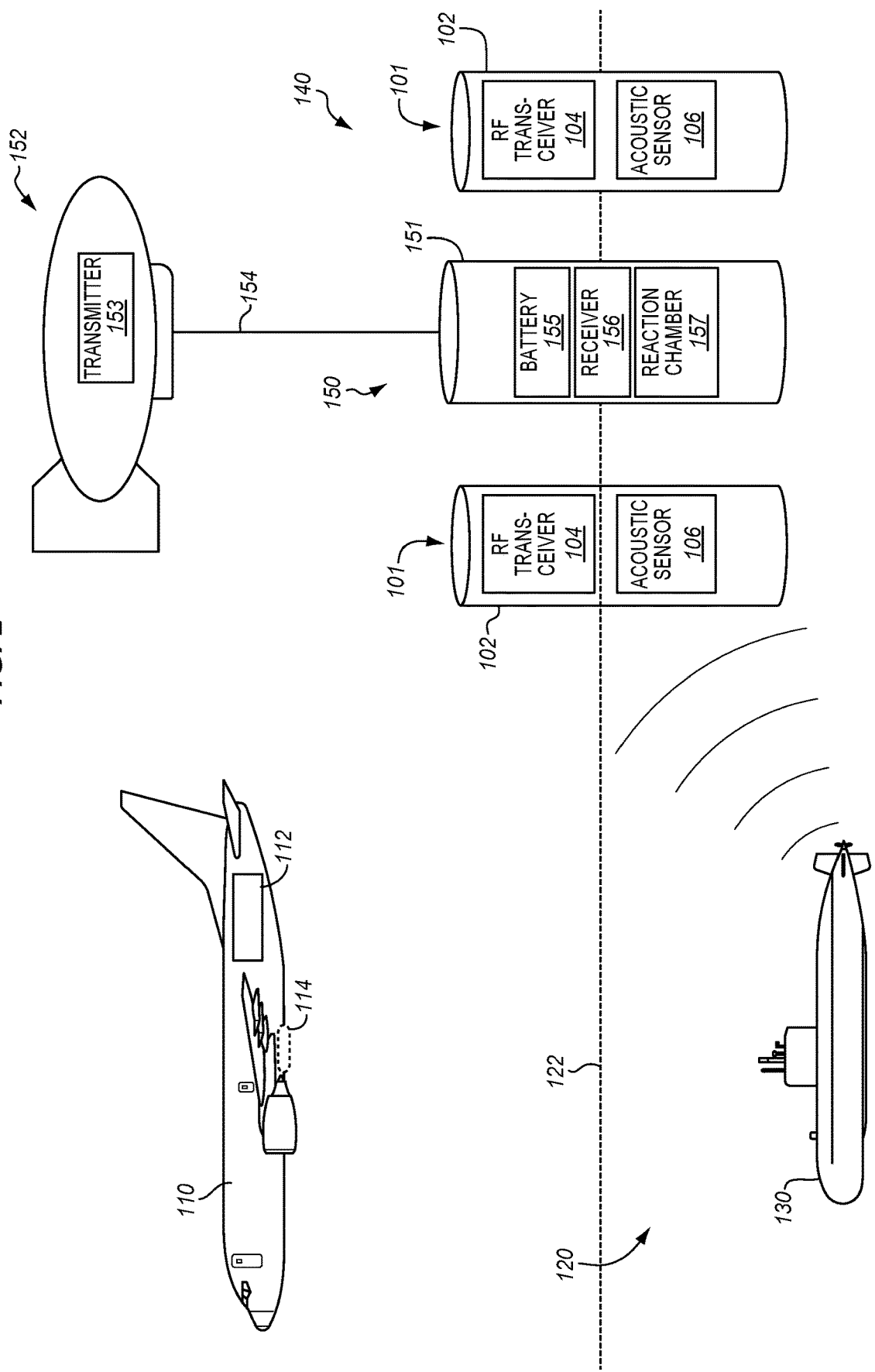
FIG. 2 shows an aerostat buoy with its aerostat launched in an illustrative embodiment.

FIG. 2 shows the aerostat buoy 150 with its aerostat 152 launched in an illustrative embodiment. After entering the seawater 120, the aerostat buoy 150 is configured to admit an amount of seawater 120 into its capsule 151 and into the reaction chamber 157. Using reactants that mix with the seawater, the reaction chamber 157 produces a lighter-than-air gas (e.g., hydrogen, helium, etc.) that inflates and launches the aerostat 152 into the air. The aerostat 152 lifts the transmitter 153 into the air and is tethered to the capsule 151 via the cable 154. In addition to allowing the aerostat 152 to rise to a designated height, the cable 154 provides power and/or communication from the capsule 151 to the aerostat 152. That is, the battery 155 and receiver 156 in the capsule 151 may transmit power and data to the transmitter 153 residing on the aerostat 152.

Advantageously, RF transceivers 104 of the sonobuoys 101 may transmit sonobuoy data to the receiver 156 in the capsule 151 which is deployed in the sonobuoy field 140 at a relatively close distance. The sonobuoys 101 may therefore spend less power on transmitting data and have increased operating lifespans as compared to submitting data directly to the aircraft 110. Additionally, the aerostat buoy 150 enables sonobuoy data to be relayed up to the transmitter 153 via the cable 154 where it is transmitted to the aircraft 110 at a height above the surface 122 of the seawater 120. This advantageously increases the RF communication horizon, and thus the range the aircraft 110 may travel from the sonobuoys 101 while still reliably receiving sonobuoy data. Still further, the capsule 151 of the aerostat buoy 150 may have the dimensions of the containers 102 of the sonobuoys 101. That is, the capsule 151 may comprise a sonobuoy launch container or otherwise have the dimensions of a standard launch container (e.g., type A, A/2, B, C, etc.). The aerostat buoy 150 may thus advantageously launch from the sonobuoy launcher 114 of the aircraft 110 into the sonobuoy field 140 to serve as an instantly deployable communications tower for a group of sonobuoys 101 in the seawater 120.

Figure 3:
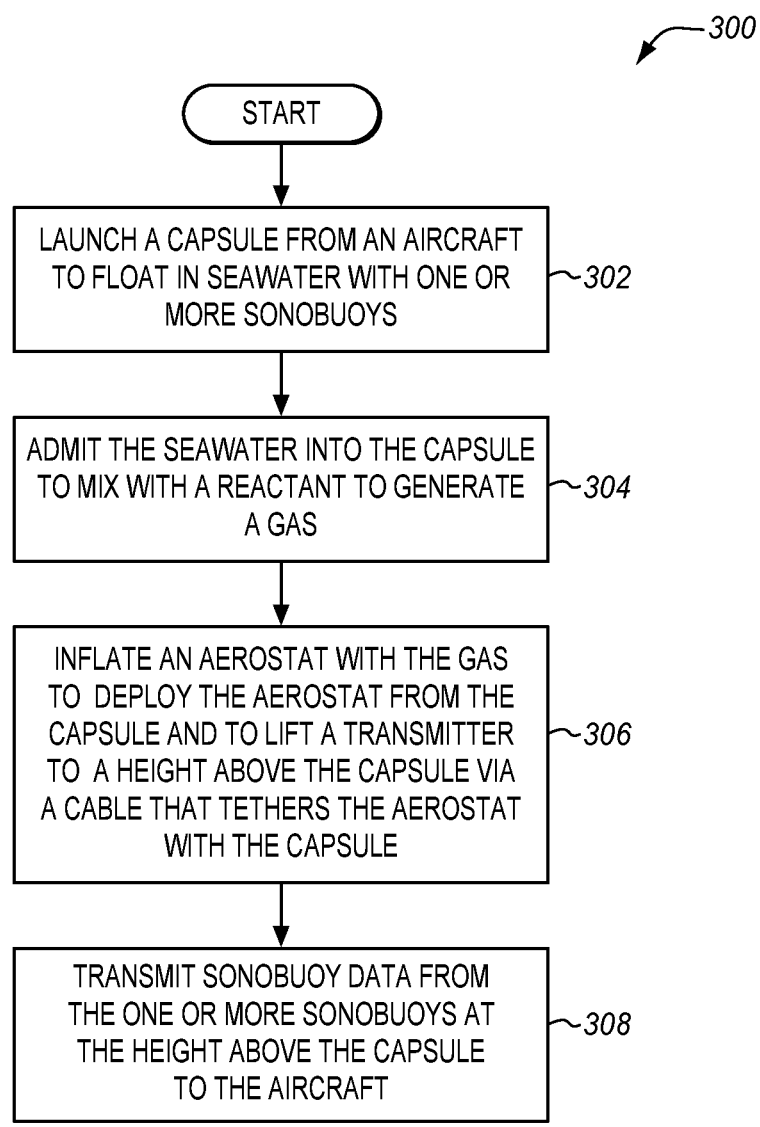
FIG. 3 is a flowchart illustrating a method for transmitting sonobuoy data from one or more sonobuoys to an aircraft in an illustrative embodiment.

FIG. 3 is a flowchart illustrating a method 300 for transmitting sonobuoy data from one or more sonobuoys to an aircraft in an illustrative embodiment. The steps of method 300 are described with reference to FIGS. 1 and 2, but those skilled in the art will appreciate that method 300 may be performed with alternative aircraft, sonobuoys, and aerostat buoys. The steps of the flowcharts described herein are not all inclusive and may include other steps not shown. The steps described herein may also be performed in an alternative order.

In step 302, the capsule 151 is launched from the aircraft 110 to float in seawater with one or more sonobuoys 101. In step 304, the capsule 151 admits seawater to mix with a reactant to generate a gas. In step 306, the aerostat 152 inflates with the gas to deploy from the capsule 151 and to lift the transmitter 153 to a height above the capsule 151 via the cable 154 that tethers the aerostat 152 with the capsule 151. In step 308, the transmitter 153 transmits the sonobuoy data from the one or more sonobuoys 101 at the height above the capsule 151 to the aircraft 110. Method 300 provides a benefit over prior techniques because it allows a sonobuoy launch container to self-deploy an aerostat to serve as a communication tower for the sonobuoys it launched from the aircraft 110.

Figure 4:
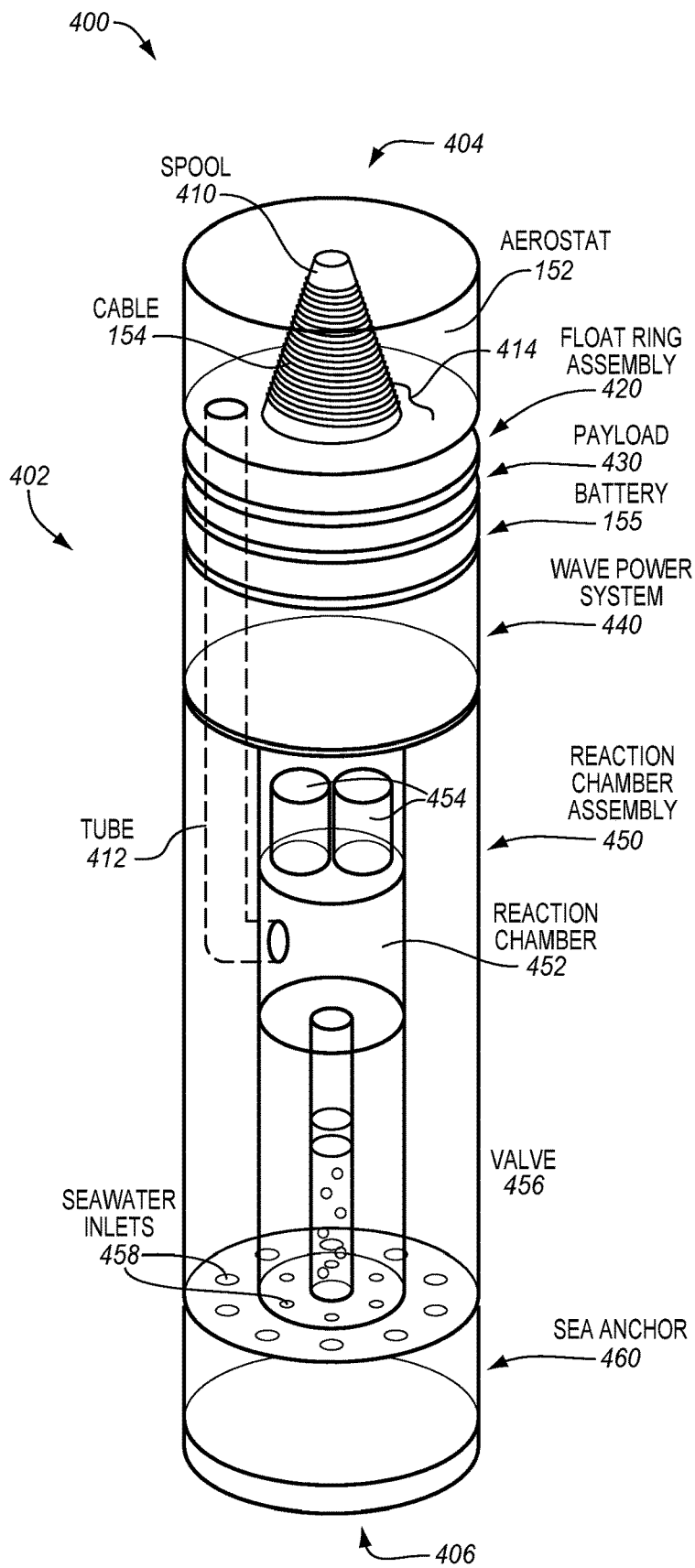
FIG. 4 shows an aerostat buoy in another illustrative embodiment.

FIG. 4 shows an aerostat buoy 400 in an illustrative embodiment. The aerostat buoy 400 includes a capsule 402 or sonobuoy launch container having a cylindrical body with a circular top end 404 and bottom end 406. The capsule 402 includes a number of components packaged inside prior to launch. In particular, in this example, the capsule 402 includes the aerostat 152 packed/folded at or near the top end 404 around a spool 410 of the cable 154. The capsule 402 also includes a float ring assembly 420, payload 430, battery 155, wave power system 440, reaction chamber assembly 450, and sea anchor 460.

The aerostat 152 inflates via a tube 412 that transports gas from the reaction chamber assembly 450 to the aerostat 152. The reaction chamber assembly 450 includes a reaction chamber 452, one or more reactants 454, a valve 456, and one or more seawater inlets 458. After the aerostat buoy 400 lands in seawater, the seawater inlets 458 introduce seawater through the valve 456 into the reaction chamber 452. The valve 456 may comprise a one-way valve to transport seawater into the reaction chamber 452 while preventing lifting gas from escaping. The reactants 454 may be stored in separate containers and combine in the reaction chamber 452 after seawater is introduced. This advantageously enhances aircraft safety by preventing lifting gas from being produced until after the aerostat buoy 400 has been ejected from the aircraft and landed in the seawater. Additionally, seawater serves as one of the reactants in the reaction chamber 452, thus reducing the weight/volume of reactants present in the aerostat buoy 400.

In one embodiment, the reaction chamber 452 produces hydrogen gas to lift the aerostat 152 by mixing water ($H_2O$) with sodium borohydride ($NaBH_4$). To expedite generation of the hydrogen, the reaction may proceed in the presence of an accelerator such as boric oxide ($B_2O_3$). The equation below represents this reaction.

$$NaBH_4 + 2H_2O(l) \xrightarrow{accelerator} NaBO_2 + 4H_2(g) \quad \text{Eq(1)}$$

For example, if the aerostat 152, the cable 154, and the payload 430 weigh 14 pounds, the reaction chamber 452 may produce 234.644 moles of hydrogen lifting gas by mixing 58.661 moles of sodium borohydride ($NaBH_4$) with 29.3305 moles of boric oxide ($B_2O_3$) to sufficiently lift the components. Thus, a total of approximately 4.26 kilograms (kg), or 9.392 pounds (lbs.), of sodium borohydride ($NaBH_4$) and boric oxide ($B_2O_3$) is to be carried in the aerostat buoy 400 prior to launch. Assuming, for example, that the capsule 402 is a type A sonobuoy launch container having a length of 36 inches and a diameter of 4 and ⅞ inches, the reactants 454 may occupy less than 15% (e.g., approximately 10%) of the total volume of the capsule 402 for the aerostat 152 to provide sufficient buoyancy for the cable 154 and the payload 430. If manually deployed and/or ejected from the free fall chute of the P-8A capable of ejecting containers of up to approximately 7 inches in diameter, the capsule 402 may comprise increased dimensions to accommodate more reactant to lift larger aerostats and/or heavier on-board aerostat equipment.

The reaction chamber assembly 450 may also be used to inflate the float ring assembly 420 to provide additional buoyancy for the capsule 402. As the aerostat 152 ascends, an attached end of the cable 154 rises as the cable 154 unwinds from the spool 410. A shock cord 414 may attach between the capsule 402 and the cable 154 to dampen shock to the cable 154 due to wave action. The wave power system 440 is configured to capture wave motion energy from relative motion of the capsule 402 with respect to the sea anchor 460, and to charge the battery 155 with the wave motion energy. The wave power system 440 advantageously provides the battery with trickle charging to extend the operating lifespan of the aerostat buoy 400.

Figure 5:
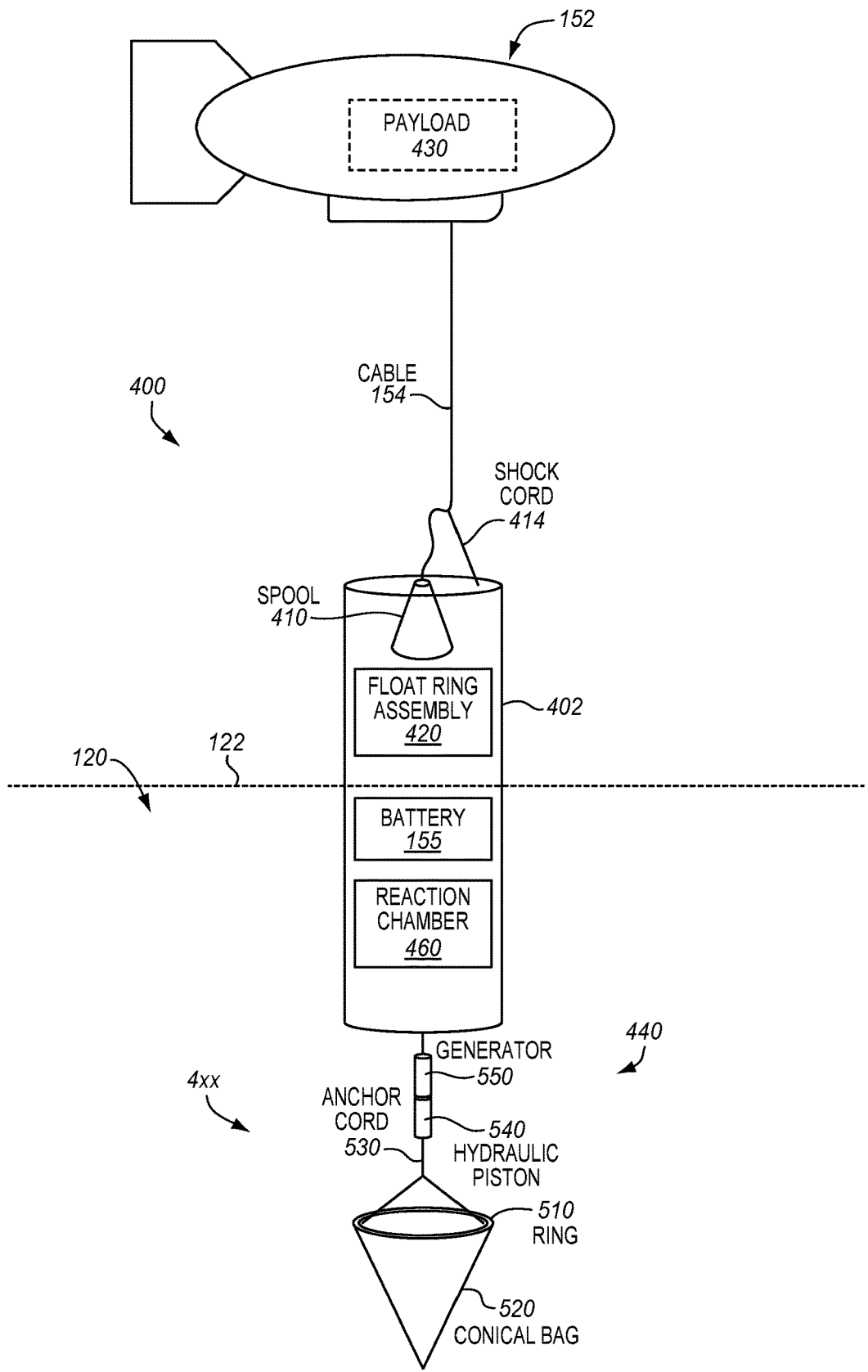
FIG. 5 shows the aerostat buoy with deployed components in another illustrative embodiment.

FIG. 5 shows the aerostat buoy 400 with deployed components in another illustrative embodiment. In addition to deploying the aerostat 152 to rise into the air, the capsule 402 deploys the sea anchor 460 underneath in the seawater 120. The sea anchor 460 may comprise a ring 510 and conical bag 520 that deploy beneath the capsule 402 to drag in the seawater 120 for maintaining a position of the capsule 402 with respect to one or more sonobuoys 101. The ring 510 and conical bag 520 are tethered to the capsule 402 via one or more anchor cords 530. The wave power system 440 includes a hydraulic piston 540 and generator 550 disposed along the anchor cord 530 to generate power from the motion of the capsule 402 at the surface 122 of the seawater 120 relative to the conical bag 520. In addition to providing trickle charging to the battery 155, the wave power system 440 is advantageously deployable from the capsule 402 or sonobuoy launch container and uses the sea anchor 460 to generate power.

In some embodiments, the reaction chamber 452 (not shown in FIG. 5) is discarded after the aerostat 152 is airborne. Products of the reaction other than the lifting gas may be discarded or used as ballast. The shock cord 414 attaches between the capsule 402 and the cable 154 to allow for slack in the cable 154 and prevent it from damage due to the relative motion of the capsule 402 and the aerostat 152. The cable 154 may reel out from the spool 410 to tether the aerostat 152 up to 1,500 feet from the capsule 402. An example of the cable 154 includes 30 American Wire Gauge (AWG) twisted pair copper wire having approximately 0.05 inches in diameter and weighing 1.3 pounds per 1,000 feet or 1.95 pounds at 1,500 feet. The cable 154 may include additional lightweight thread material to provide tensile strength to the wire.

Figure 6:
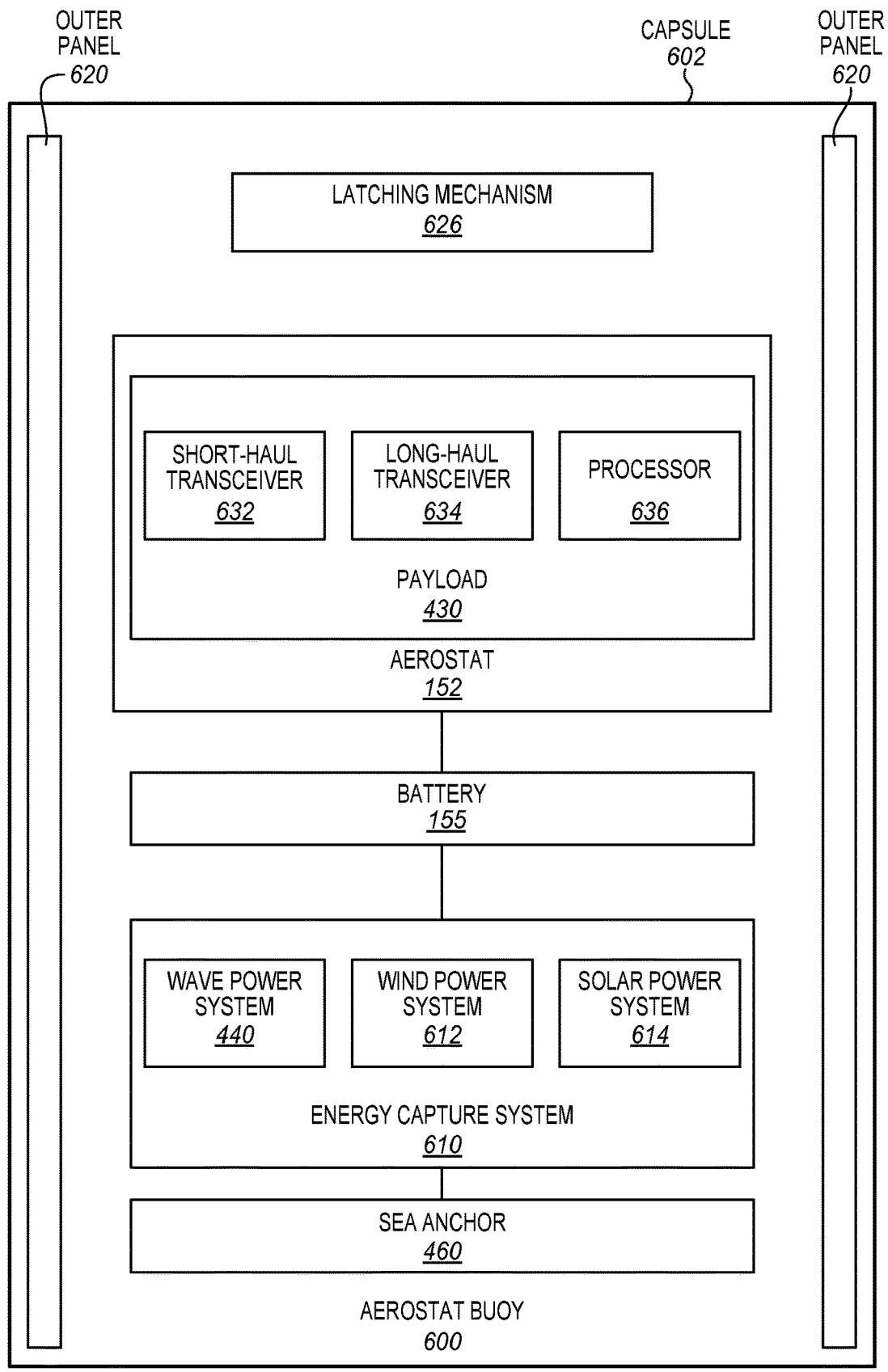
FIG. 6 is a block diagram of an aerostat buoy in an illustrative embodiment.

FIG. 6 is a block diagram of an aerostat buoy 600 in an illustrative embodiment. The aerostat buoy 600 may include an energy capture system 610 that includes the wave power system 440, wind power system 612, and/or solar power system 614. The wind power system 612 is configured to capture wind energy from wind passing by the capsule 602, and to charge the battery 155 with the wind energy. For example, the wind power system 612 may include a small wind turbine affixed to the capsule 602 above the surface 122 of the seawater 120 to provide supplementary power. Surfaces of various components of the aerostat buoy 600, including outer surfaces of the capsule 602, auxiliary float devices, and/or aerostat 152, may be covered with a solar cell material or spray that provides trickle charging to the battery 155.

The capsule 602 may include outer panels 620 configured to break away after hitting the seawater 120. For example, the outer panels 620 may form at least a portion of the cylindrical body of the capsule 602 and include water soluble seams that connect the outer panels 620 together. The seams may be protected by a strip of tape that is removed by an operator just prior to launching the aerostat buoy 600 from an aircraft. As the aerostat buoy 600 bobs in the water, the seams dissolve and the outer panels 620 come off to expose the aerostat 152, allowing it to expand and ascend. Alternatively or additionally, the capsule 602 may include a latching mechanism 626 to prevent ascent of the aerostat 152 before inflation is complete. The latching mechanism 626 may release the aerostat 152 based on a period of time of inflation or in response to detecting the aerostat 152 is inflated with a sufficient buoyant force to lift the payload 430.

The payload 430 lifted by the aerostat 152 may include a short-haul transceiver 632 to communicate with sonobuoys 101 below, a long-haul transceiver 634 to communicate with the RF communication 112 of the aircraft 110, and/or a processor 636 to perform data processing functions on the sonobuoy data prior to transmitting with the long-haul transceiver 634. In one embodiment, the payload 430 includes a Boeing TCCR-Ultra having two 30-512 Megahertz (MHz) receivers and a 1 Watt (W) output transmitter with a combined weight of 500 grams. In some embodiments, the short-haul transceiver 632 and/or processor 636 may remain in the capsule 602 to limit the weight of the payload 430 carried by the aerostat 152. For example, the short-haul transceiver 632 may be configured to communicate wirelessly with the sonobuoys 101 to receive sonobuoy data at the surface 122 of the seawater 120, and transmit the sonobuoy data through the cable 154 to the components on-board the aerostat 152. Alternatively, the cable 154 may transmit power but not data to the components on-board the aerostat 152 and the short-haul transceiver 632 may ascend with the aerostat 152 to communicate wirelessly with the sonobuoys 101 at a lifted position.

The processor 636 may be communicatively coupled with the short-haul transceiver 632 and the long-haul transceiver 634 and be configured to perform signal processing on raw sonobuoy data to produce line data. By producing line data, the processor 636 reduces the amount of data for the long-haul transceiver 634 to send to the aircraft and thus reduces power consumption for long-haul transmissions. Signal processing functions, including performance of data reduction, provided by the processor 636 may support the aerostat buoy 600 to serve as a central communication node for a sonobuoy field and allow the field to form a network. The processor 636 may also process commands sent to the aerostat buoy 600 from the aircraft such as commands to scuttle.

It will be appreciated that the particular arrangement of components packaged in the aerostat buoy 600 is an example provided for discussion purposes and that alternative arrangements and configurations are possible. For example, in embodiments for which the size of the aerostat 152 is relatively larger, the aerostat 152 may pack inside the aerostat buoy 600 for a length of the capsule 602 to surround a central core of the aerostat buoy 600 including the payload 430, the wave power system 440, the reactants 454, and the reaction chamber 452. This arrangement may enable the aerostat 152 to lift a heavier payload 430 if desired. In such an arrangement, the payload 430 may be disposed underneath the wave power system 440 closer to the bottom end 406. In yet another embodiment, the inflation mechanism may use compressed helium or hot air to inflate the aerostat 152.

Figure 7:
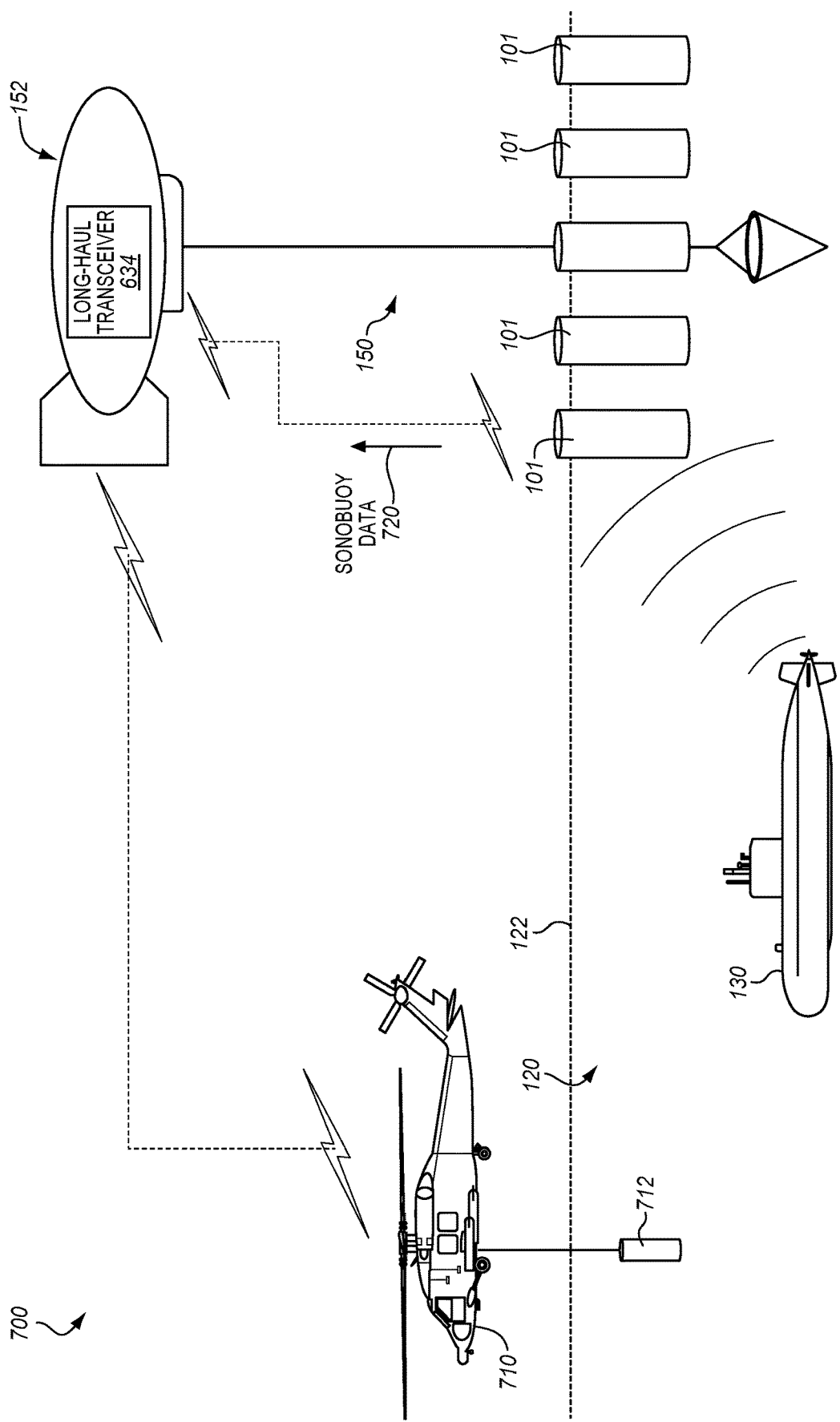
FIG. 7 illustrates an environment for deploying an aerostat buoy with a field of sonobuoys in an illustrative embodiment.

FIG. 7 illustrates an environment 700 for deploying an aerostat buoy 150 with a field of sonobuoys 101 in an illustrative embodiment. Suppose, for this example, that an Anti-Submarine Warfare (ASW) helicopter 710, such as the MH-60, uses a dipping sonar 712 after deploying the aerostat buoy 150 in the field of sonobuoys 101. In doing so, the ASW helicopter 710 hovers at a low altitude (e.g., approximately 80 feet above the surface 122 of the seawater 120) to submerge the dipping sonar 712 for detecting a location of the submarine 130. During this period, the ASW helicopter 710 may be unable to communication directly with the sonobuoys 101 due to its low altitude.

However, the aerostat buoy 150 allows the ASW helicopter 710 to remain in communication with the field of sonobuoys 101 while deploying the dipping sonar 712. That is, sonar signals detected by the sonobuoys 101 may be relayed as sonobuoy data 720 up to the aerostat 152 where it is transmitted at altitude to the ASW helicopter 710. With the long-haul transceiver 634 transmitting data at an elevation as low as 100 feet above the seawater 120, the RF horizon extends to approximately 12 nautical miles to maintain communication with the ASW helicopter 710. If elevated to 1,000 feet, the long-haul transceiver 634 may transmit the sonobuoy data 720 to the ASW helicopter 710 at least 39 nautical miles away.

Figure 8:
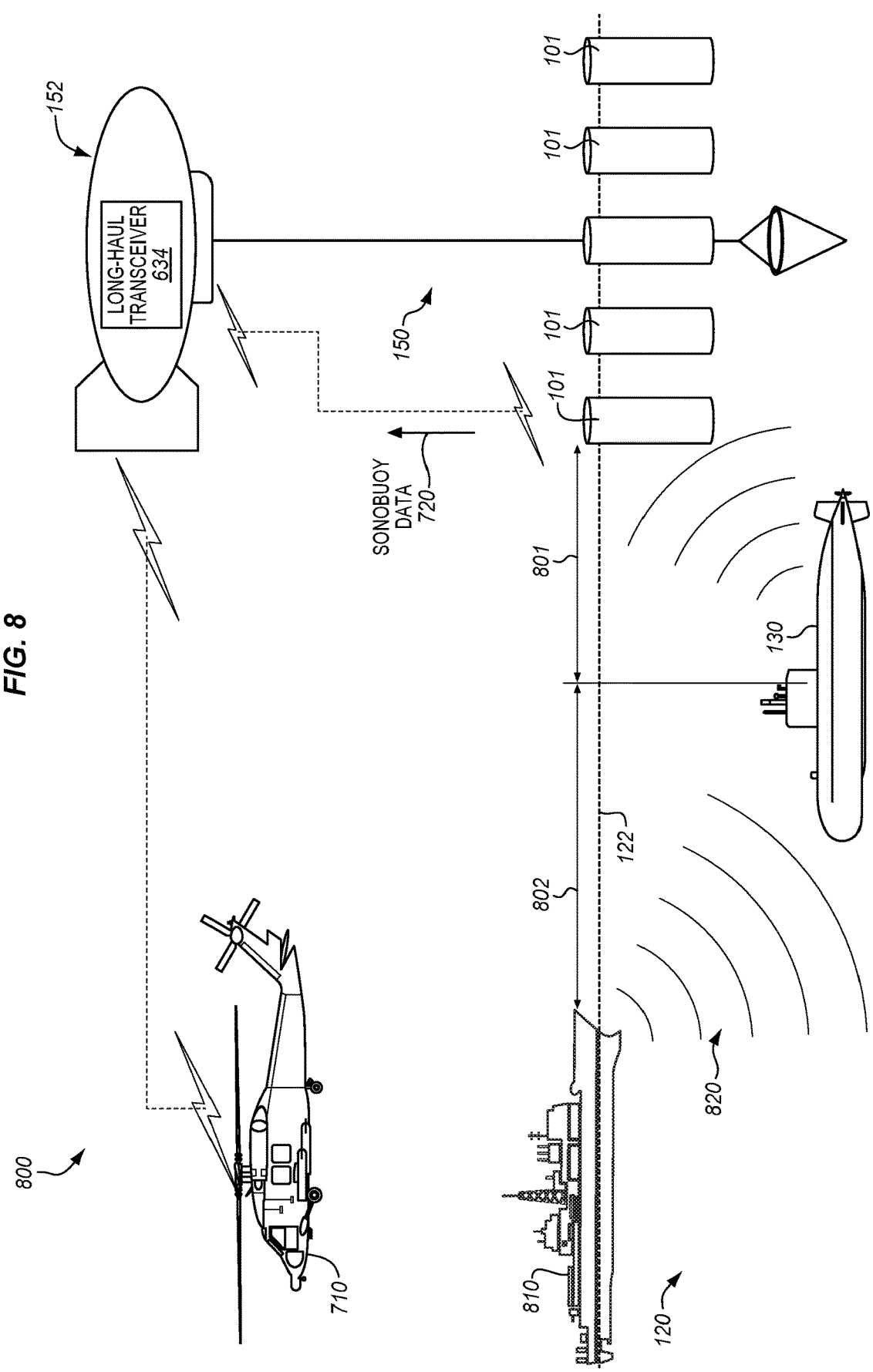
FIG. 8 illustrates an environment for deploying an aerostat buoy with a field of sonobuoys in another illustrative embodiment.

FIG. 8 illustrates an environment 800 for deploying an aerostat buoy 150 with a field of sonobuoys 101 in another illustrative embodiment. As shown in this example, an ASW surface combatant 810 or battleship may deploy the aerostat buoy 150 with the field of sonobuoys 101 using its on-board ASW helicopter 710. The aerostat buoy 150 and/or sonobuoys 101 may be dropped from a cabin of the ASW helicopter 710 rather than launched from a sonobuoy ejector. The aerostat buoy 150 provides tactical coordination between the field of sonobuoys 101 and the ASW surface combatant 810. Similar to that described in the previous example, the ASW surface combatant 810 may continue to interact with the sonobuoys 101 at increased distances due to the height of the long-haul transceiver 634. That is, the aerostat buoy 150 allows the field of sonobuoys 101 to communicate with the ASW surface combatant over the horizon.

Moreover, the ASW surface combatant 810 may employ its active sonar 820 in concert with the field of sonobuoys 101 to help detect whether the submarine 130 is near the sonobuoys 101. Suppose, for example, that the field of sonobuoys 101 is a first distance 801 from the submarine 130 that is much closer than a second distance 802 between the ASW surface combatant 810 and the submarine 130. If the sonobuoys 101 closer to the submarine 130 are able to detect the active sonar 820 reflected off the submarine 130 and relay it as sonobuoy data 720 back to the ASW surface combatant 810, there is no need for the ASW surface combatant 810 to hear the return echo of its ping. Accordingly, the ASW surface combatant 810 may detect the submarine 130 with its active sonar 820 for distances up to two times the range as compared to listening for the return echo.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An apparatus comprising:
a capsule configured to launch from an aircraft and float in seawater with sonobuoys in a sonobuoy field, the capsule comprising:
a receiver configured to receive sonobuoy data from the sonobuoys in the sonobuoy field;
a transmitter configured to transmit the sonobuoy data to the aircraft;
a cable configured to power the transmitter via a battery;
a reaction chamber including a reactant and configured to generate a gas from the seawater mixing with the reactant; and
an aerostat tethered to the capsule via the cable and configured to inflate with the gas produced by the reaction chamber, to ascend above the capsule with the transmitter to increase a distance for transmitting the sonobuoy data to the aircraft, and to serve as a central communication node for the sonobuoy field.

2. The apparatus of claim 1 wherein the capsule further includes:
a sea anchor comprising a ring and conical bag and configured to deploy beneath the capsule to drag in the seawater for maintaining a position of the capsule with respect to the sonobuoys.

3. The apparatus of claim 2 wherein the capsule further includes:
a wave power system configured to capture wave motion energy from relative motion of the capsule with respect to the sea anchor, and to charge the battery with the wave motion energy.

4. The apparatus of claim 1 wherein:
the aerostat is further configured to facilitate formation of a network at the sonobuoy field.

5. The apparatus of claim 1 wherein:
the aerostat is configured to relay sonar signals detected by the sonobuoys to the aircraft.

6. The apparatus of claim 1 further comprising:
a processor coupled with the receiver and configured to perform data reduction on the sonobuoy data prior to transmitting with the transmitter.

7. The apparatus of claim 1 wherein:
the cable is configured to transport the sonobuoy data from the receiver to the transmitter.

8. The apparatus of claim 1 wherein the capsule further includes:
a wind power system configured to capture wind energy from wind passing by the capsule, and to charge the battery with the wind energy.

9. The apparatus of claim 1 wherein:
the reaction chamber includes an inlet valve to admit the seawater from outside the capsule into the reaction chamber.

10. A method comprising:
launching a capsule from an aircraft to float in seawater with sonobuoys in a sonobuoy field;
admitting the seawater into the capsule to mix with a reactant to generate a gas;
inflating an aerostat with the gas to deploy the aerostat from the capsule and to lift a transmitter to a height above the capsule via a cable that tethers the aerostat with the capsule;
operating the aerostat as a central communication node for the sonobuoy field; and
transmitting sonobuoy data from the sonobuoys in the sonobuoy field at the height above the capsule to the aircraft.

11. The method of claim 10 further comprising:
deploying a sea anchor beneath the capsule to drag in the seawater and maintain a position of the capsule with respect to the sonobuoys.

12. The method of claim 10 further comprising:
capturing wave motion energy from relative motion of the capsule with respect to a sea anchor;
charging a battery in the capsule with the wave motion energy; and
powering the transmitter with the battery via the cable that tethers the aerostat with the capsule.

13. The method of claim 10 further comprising:
receiving the sonobuoy data from the sonobuoys in the sonobuoy field at a receiver in the capsule;
transporting the sonobuoy data from the receiver to the transmitter on the aerostat via the cable; and
relaying the sonobuoy data from the sonobuoys in the sonobuoy field to the aircraft via the aerostat.

14. The method of claim 10 further comprising:
forming a network at the field of sonobuoys.

15. The method of claim 10 further comprising:
unspooling the cable from a spool in the capsule as the aerostat ascends.

16. A system comprising:
an aircraft; and
a capsule configured to drop from the aircraft with sonobuoys in a field of sonobuoys to float in seawater, to admit the seawater to mix with a reactant to generate a gas, to inflate an aerostat with the gas to deploy the aerostat from the capsule and to lift a transmitter to a height above the capsule via a cable that tethers the aerostat with the capsule, and to receive sonobuoy data from the sonobuoys in the sonobuoy field, and to serve as a central communication node for the sonobuoy field,
wherein the transmitter on the aerostat is configured to transmit the sonobuoy data at the height above the capsule to the aircraft.

17. The system of claim 16 wherein the aircraft includes:
the aerostat is further configured to enable formation of a network at the sonobuoy field.

18. The system of claim 16 wherein:
the aerostat is configured to relay sonar signals detected by the sonobuoys to the aircraft.

19. The system of claim 16 wherein the capsule includes:
a battery configured to power the transmitter via the cable.

20. The system of claim 16 wherein:
the gas includes hydrogen.

* * * * *